(12) United States Patent
Wu et al.

(10) Patent No.: US 9,197,727 B2
(45) Date of Patent: Nov. 24, 2015

(54) MOBILE COMMUNICATION DEVICE CAPABLE OF RAPIDLY MAKING PHONE CALL IN LOCK STATE AND METHOD THEREOF

(71) Applicant: Wistron Corporation, New Taipei (TW)

(72) Inventors: Cassie WZ Wu, New Taipei (TW); Grace Lu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 14/535,284

(22) Filed: Nov. 6, 2014

(65) Prior Publication Data

US 2015/0281420 A1    Oct. 1, 2015

(30) Foreign Application Priority Data

Mar. 31, 2014   (CN) .......................... 2014 1 0126880

(51) Int. Cl.
*H04M 1/66* (2006.01)
*H04M 1/27* (2006.01)
*H04M 1/725* (2006.01)
*H04M 1/673* (2006.01)

(52) U.S. Cl.
CPC ................ *H04M 1/27* (2013.01); *H04M 1/673* (2013.01); *H04M 1/72541* (2013.01)

(58) Field of Classification Search
USPC ............. 455/127.4, 550.1, 552.1, 553.1, 407, 455/411, 425, 556.2, 566
See application file for complete search history.

(56) References Cited

U.S. PATENT DOCUMENTS

| | | | | |
|---|---|---|---|---|
| 6,072,868 A * | 6/2000 | Irvin | ................... | H04M 1/2745 379/355.09 |
| 6,104,790 A * | 8/2000 | Narayanaswami | . | H04M 1/2471 379/93.17 |
| 6,134,312 A * | 10/2000 | Peoples | ............. | H04M 3/42195 379/201.01 |
| 6,574,670 B1 * | 6/2003 | Eguchi | ............... | H04N 1/00212 709/219 |
| 2001/0000505 A1 * | 4/2001 | Segal | ..................... | G06Q 20/32 455/405 |
| 2002/0057783 A1 * | 5/2002 | Kredo | ..................... | H04L 29/06 379/218.01 |
| 2002/0186832 A1 * | 12/2002 | Mani | ............... | H04M 1/274558 379/355.01 |
| 2005/0170818 A1 * | 8/2005 | Netanel | ................... | G06Q 20/32 455/415 |
| 2006/0015819 A1 * | 1/2006 | Hawkins | ............. | H04M 1/0254 715/780 |
| 2006/0205432 A1 * | 9/2006 | Hawkins | ........... | H04M 1/27455 455/552.1 |
| 2009/0273438 A1 * | 11/2009 | Sultan | ................. | G07C 9/00103 340/5.7 |
| 2010/0303061 A1 * | 12/2010 | Wan | .................. | H04M 3/42365 370/352 |
| 2011/0237274 A1 * | 9/2011 | Wong | ........................ | G01S 1/68 455/456.1 |

* cited by examiner

*Primary Examiner* — Dominic E Rego

(74) *Attorney, Agent, or Firm* — Winston Hsu; Scott Margo

(57) ABSTRACT

A mobile communication device includes a storage unit for storing an unlock password, M speed dial codes and N phone numbers, each of the M speed dial codes being corresponding to one of the N phone numbers; an input unit; a communication unit; and a processing unit; wherein when the input unit is operated to sequentially input a user input password and a user input code in a lock state, the processing unit determines whether the user input password is identical to the unlock password and determines whether the user input code is identical to one of the M speed dial codes, when the user input password is identical to the unlock password and the user input code is identical to an i-th speed dial code, the processing unit dials the phone number corresponding to the i-th speed dial code through the communication unit.

18 Claims, 3 Drawing Sheets

MOBILE COMMUNICATION DEVICE CAPABLE OF RAPIDLY MAKING PHONE CALL IN LOCK STATE AND METHOD THEREOF

BACKGROUND OF THE INVENTION

1. Field of the Invention

The invention relates to a mobile communication device and, more particularly, to a mobile communication device capable of rapidly making a phone call in a lock state and a method thereof.

2. Description of the Prior Art

So far a mobile communication device (e.g. smart phone) has been considered a necessity by a lot of people in their daily lives. In general, when the mobile communication device is idle, a user usually switches the mobile communication device to a lock state, so as to prevent the mobile communication device from being actuated accidentally and avoid unnecessary trouble for the user. When the user wants to make a phone call in the lock state, the user has to input an unlock password first to unlock the lock state. Then, the user has to operate a specific application further to make the phone call. If the user is in urgent need of making the phone call, the aforesaid complicated operation will cause a big trouble to the user.

SUMMARY OF THE INVENTION

The invention provides a mobile communication device capable of rapidly making a phone call in a lock state and a method thereof, so as to solve the aforesaid problems.

According to the claimed invention, a mobile communication device, which is capable of rapidly making a phone call in a lock state, comprises a storage unit, an input unit, a communication unit and a processing unit. The storage unit is used for storing an unlock password, M speed dial codes and N phone numbers, wherein each of the M speed dial codes is corresponding to one of the N phone numbers, N is a positive integer, and M is a positive integer smaller than or equal to N. The processing unit is electrically connected to the storage unit, the input unit and the communication unit. When the input unit is operated to sequentially input a user input password and a user input code in the lock state, the processing unit determines whether the user input password is identical to the unlock password and determines whether the user input code is identical to one of the M speed dial codes. When the user input password is identical to the unlock password and the user input code is identical to an i-th speed dial code of the M speed dial codes, the processing unit dials the phone number corresponding to the i-th speed dial code through the communication unit, wherein i is a positive integer smaller than or equal to M.

According to the claimed invention, when the user input password is different from the unlock password, the processing unit outputs a first notification message to notice that the user input password is wrong.

According to the claimed invention, when the user input password is identical to the unlock password but the user input code is different from each of M speed dial codes, the processing unit outputs a second notification message to notice that the user input code is wrong.

According to the claimed invention, after finishing dialing the phone number corresponding to the i-th speed dial code, the processing unit unlocks the lock state of the mobile communication device.

According to the claimed invention, after finishing dialing the phone number corresponding to the i-th speed dial code, the processing unit maintains the lock state of the mobile communication device.

According to the claimed invention, the storage unit stores a first look-up table and a second look-up table, the first look-up table records the unlock password and an identification code, and the second look-up table records the M speed dial codes, M of the N phone numbers corresponding to the M speed dial codes, and the identification code. The processing unit combines the first look-up table and the second look-up table according to the identification code to form a virtual look-up table. The processing unit determines whether the user input password is identical to the unlock password and determines whether the user input code is identical to one of the M speed dial codes according to the virtual look-up table.

According to the claimed invention, a method, which is capable of rapidly making a phone call in a lock state, is adapted to a mobile communication device. The mobile communication device comprises a storage unit, an input unit, a communication unit and a processing unit, wherein the processing unit is electrically connected to the storage unit, the input unit and the communication unit. The storage unit stores an unlock password, M speed dial codes and N phone numbers, wherein each of the M speed dial codes is corresponding to one of the N phone numbers, N is a positive integer, and M is a positive integer smaller than or equal to N. The method comprises steps of the input unit sequentially inputting a user input password and a user input code in the lock state; the processing unit determining whether the user input password is identical to the unlock password and determining whether the user input code is identical to one of the M speed dial codes; and when the user input password is identical to the unlock password and the user input code is identical to an i-th speed dial code of the M speed dial codes, the processing unit dialing the phone number corresponding to the i-th speed dial code through the communication unit, wherein i is a positive integer smaller than or equal to M.

According to the claimed invention, the method further comprises step of when the user input password is different from the unlock password, the processing unit outputting a first notification message to notice that the user input password is wrong.

According to the claimed invention, the method further comprises step of when the user input password is identical to the unlock password but the user input code is different from each of M speed dial codes, the processing unit outputting a second notification message to notice that the user input code is wrong.

According to the claimed invention, the method further comprises step of after finishing dialing the phone number corresponding to the i-th speed dial code, the processing unit unlocking the lock state of the mobile communication device.

According to the claimed invention, the method further comprises step of after finishing dialing the phone number corresponding to the i-th speed dial code, the processing unit maintaining the lock state of the mobile communication device.

According to the claimed invention, the storage unit stores a first look-up table and a second look-up table, the first look-up table records the unlock password and an identification code, and the second look-up table records the M speed dial codes, M of the N phone numbers corresponding to the M speed dial codes, and the identification code. The method further comprises steps of the processing unit combining the first look-up table and the second look-up table according to the identification code to form a virtual look-up table; and the processing unit determining whether the user input password is identical to the unlock password and determining whether the user input code is identical to one of the M speed dial codes according to the virtual look-up table.

As mentioned in the above, a user can set the speed dial codes and the phone numbers corresponding to the speed dial codes in the mobile communication device of the invention in advance. When the mobile communication device of the invention is in the lock state, the user can operate the input unit to sequentially input the user input password and the user input code. When the processing unit determines that the user input password is identical to the unlock password and user input code is identical to one of the speed dial codes, the processing unit dials the phone number corresponding to the speed dial code through the communication unit accordingly. Therefore, the mobile communication device of the invention is capable of rapidly making a phone call in the lock state without increasing any hardware cost. After finishing the phone call, the processing unit may unlock or maintain the lock state of the mobile communication device according to a specific setting preset by the user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
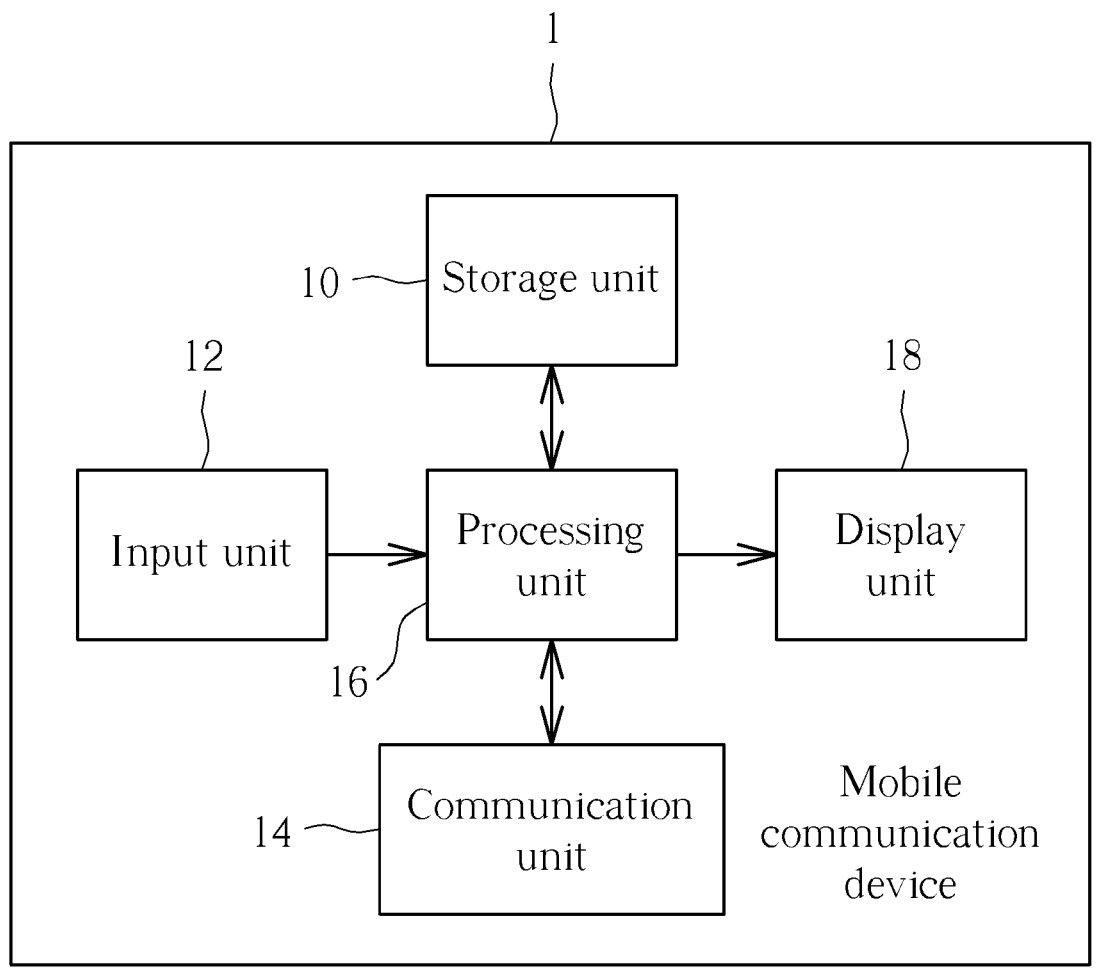
FIG. 1 is a functional block diagram illustrating a mobile communication device capable of rapidly making a phone call in a lock state according to an embodiment of the invention.
Figure 2:
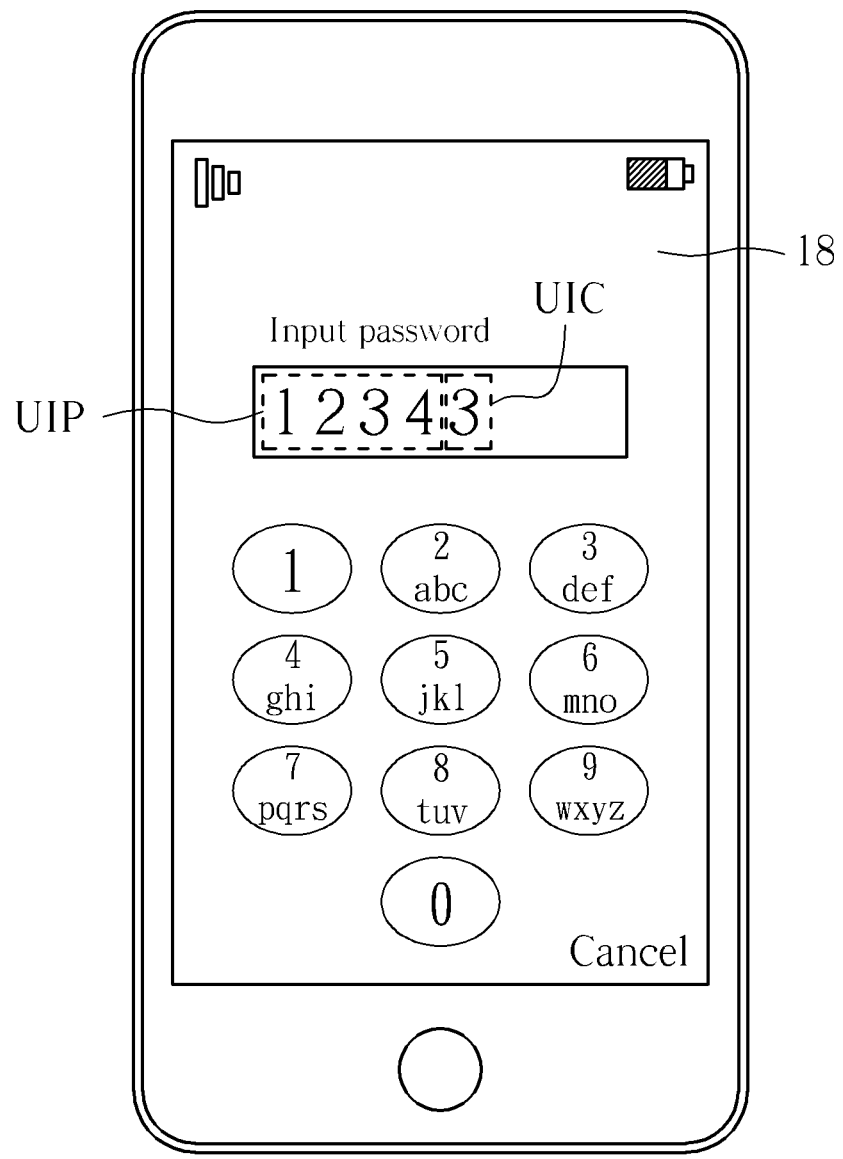
FIG. 2 is a schematic diagram illustrating an unlock screen displayed by the mobile communication device shown in FIG. 1.
Figure 3:
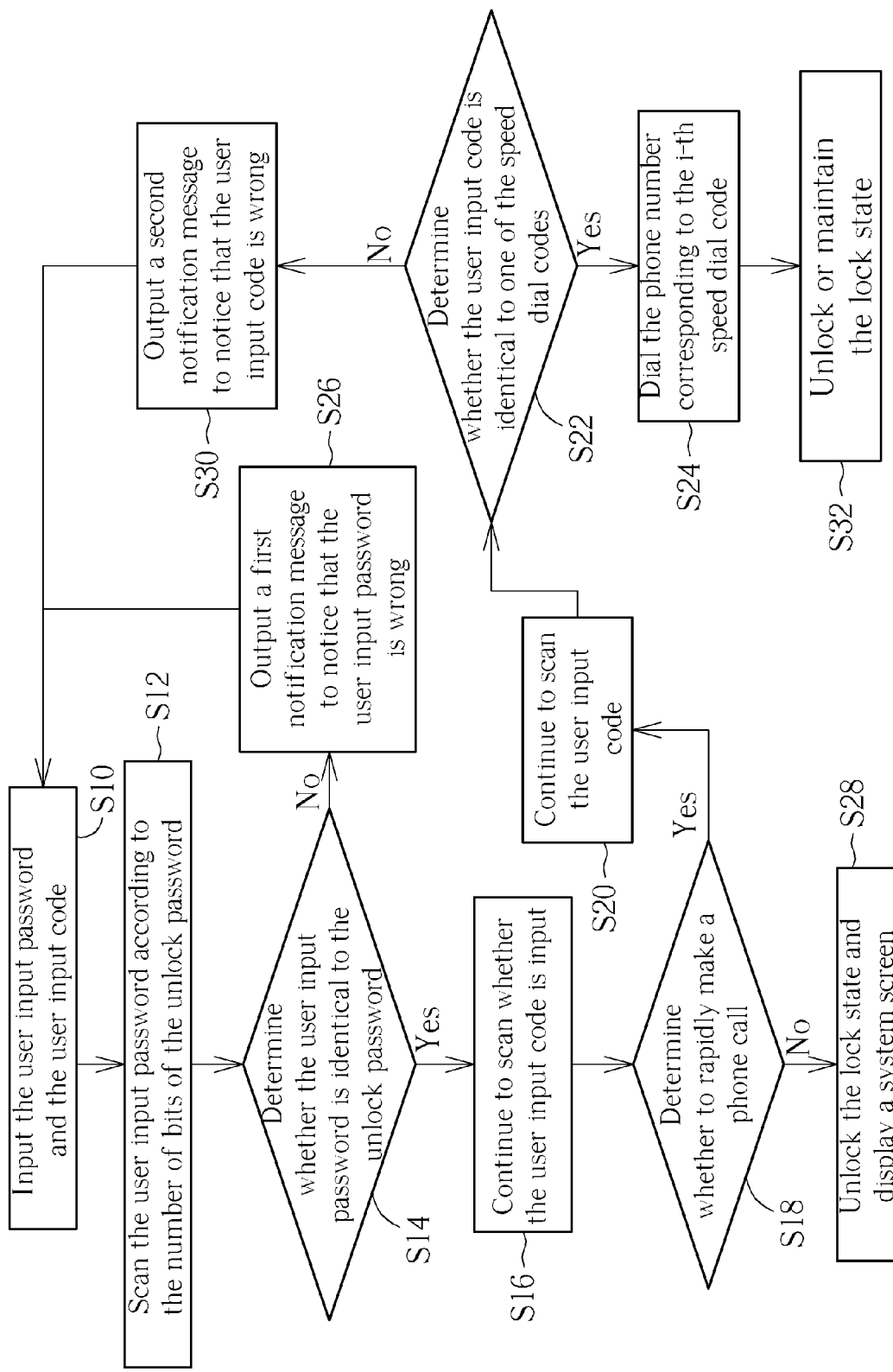
FIG. 3 is a flowchart illustrating a method capable of rapidly making a phone call in a lock state according to an embodiment of the invention.

Referring to FIGS. 1 to 3, FIG. 1 is a functional block diagram illustrating a mobile communication device 1 capable of rapidly making a phone call in a lock state according to an embodiment of the invention, FIG. 2 is a schematic diagram illustrating an unlock screen displayed by the mobile communication device 1 shown in FIG. 1, and FIG. 3 is a flowchart illustrating a method capable of rapidly making a phone call in a lock state according to an embodiment of the invention. The method capable of rapidly making a phone call in a lock state, shown in FIG. 3, is adapted to the mobile communication device 1 shown in FIG. 1.

As shown in FIG. 1, the mobile communication device 1 comprises a storage unit 10, an input unit 12, a communication unit 14, a processing unit 16 and a display unit 18, wherein the processing unit 16 is electrically connected to the storage unit 10, the input unit 12, the communication unit 14 and the display unit 18. In this embodiment, the mobile communication device 1 may be an electronic device with communication and screen lock functions, such as a mobile phone, a personal digital assistant, a tablet computer, etc.; the storage unit 10 may be a memory, a memory card or other data storage devices; the input unit 12 may be a touch panel, keyswitches or other input devices; the communication unit 14 may be a wireless communication module (e.g. Wi-Fi, 3G/4G, etc.); the processing unit 16 may be a processor or controller with data processing function; and the display unit 18 may be a liquid crystal display device or other display devices. In general, the mobile communication device 1 may be further equipped with some necessary hardware or software components for specific purposes, such as a power supply, an operating system, applications, an antenna, etc., and it depends on practical applications.

In this embodiment, the storage unit 10 stores an unlock password, M speed dial codes and N phone numbers, and each of the M speed dial codes is corresponding to one of the N phone numbers, wherein N is a positive integer and M is a positive integer smaller than or equal to N. Preferably, the storage unit 10 may store a first look-up table as shown in the following table 1 and a second look-up table as shown in the following table 2.

TABLE 1

First look-up table

| Number of bits of unlock password | Unlock password | Identification code |
|---|---|---|
| 4 | 1234 | 1 |

TABLE 2

Second look-up table

| Name | Phone number | Speed dial code | Identification code |
|---|---|---|---|
| Father | 139XXXXXXXX | 1 | 1 |
| Mother | 135XXXXXXXX | 2 | 1 |
| Husband | 189XXXXXXXX | 3 | 1 |
| Sister | 133XXXXXXXX | 4 | 1 |
| Son | 155XXXXXXXX | 5 | 1 |
| Friend | 156XXXXXXXX | 6 | 1 |

As shown in the table 1, the first look-up table records an unlock password, an identification code and a number of bits of the unlock password. In this embodiment, the unlock password consists of four numbers, such that the number of bits of the unlock password are equal to four. If the unlock password consists of three numbers, the number of bits of the unlock password will be equal to three; if the unlock password consists of five numbers, the number of bits of the unlock password will be equal to five; and so on. Furthermore, the unlock password may also be letters or a combination of letter and number, so it is not limited to number only. A user can operate the input unit 12 to set the unlock password. After setting the unlock password, the invention will store the unlock password in the storage unit 10 in the form of the first look-up table shown in the table 1.

As shown in the table 2, the second look-up table records six speed dial codes (i.e. M=6), six phone numbers corresponding to the six speed dial codes, the identification code and six names corresponding to the six phone numbers. In this embodiment, the user can operate the input unit 12 to input, for example, fifty phone numbers (i.e. N=50) and then set six speed dial codes for six of the fifty phone numbers correspondingly. After setting the speed dial codes, the invention will store the speed dial codes and the corresponding phone numbers in the storage unit 10 in the form of the second look-up table shown in the table 2.

In this embodiment, the processing unit 16 may combine the first look-up table and the second look-up table according to the identification code of the first and second look-up tables, so as to form a virtual look-up table, as shown in the following table 3. Then, the processing unit 16 performs scanning and comparing processes according to the virtual look-up table shown in the table 3.

TABLE 3

Virtual look-up table

| Number of bits of unlock password | Unlock password | Name | Phone number | Speed dial code | Identification code |
|---|---|---|---|---|---|
| 4 | 1234 | Father | 139XXXXXXXX | 1 | 1 |
| 4 | 1234 | Mother | 135XXXXXXXX | 2 | 1 |
| 4 | 1234 | Husband | 189XXXXXXXX | 3 | 1 |
| 4 | 1234 | Sister | 133XXXXXXXX | 4 | 1 |
| 4 | 1234 | Son | 155XXXXXXXX | 5 | 1 |
| 4 | 1234 | Friend | 156XXXXXXXX | 6 | 1 |

When the mobile communication device 1 of the invention is in a lock state, the user can operate the input unit 12 to sequentially input a user input password UIP and a user input code UIC in the unlock screen shown in FIG. 2, so as to rapidly make a phone call. When the input unit 12 is operated to sequentially input the user input password UIP and the user input code UIC in the lock state (step S10 in FIG. 3), the processing unit 16 scans the user input password UIP according to the number of bits of the unlock password shown in the virtual look-up table (step S12 in FIG. 3), so as to determine whether the user input password UIP is identical to the unlock password shown in the virtual look-up table (step S14 in FIG. 3). When the user input password UIP is identical to the unlock password, the processing unit 16 continues to scan whether the user input code UIC is input (step S16 in FIG. 3), so as to determine whether to rapidly make a phone call (step S18 in FIG. 3). When the user input code UIC is input, the processing unit 16 continues to scan the user input code UIC (step S20 in FIG. 3), so as to determine whether the user input code UIC is identical to one of the speed dial codes shown in the virtual look-up table (step S22 in FIG. 3). When the user input code UIC is identical to an i-th speed dial code shown in the virtual look-up table, the processing unit 16 dials the phone number corresponding to the i-th speed dial code through the communication unit 14 (step S24 in FIG. 3), wherein i is a positive integer smaller than or equal to M. In the table 3, M=6, so i≤6.

As shown in FIG. 2 and table 3, since the user input password UIP is identical to the unlock password shown in the virtual look-up table and the user input code UIC is identical to the third speed dial code shown in the virtual look-up table, the processing unit 16 dials the phone number corresponding to the third speed dial code through the communication unit 14 accordingly (i.e. the phone number of husband: 189XXXXXXXX). Therefore, the mobile communication device 1 of the invention is capable of rapidly making a phone call in the lock state without increasing any hardware cost. After finishing the phone call, the processing unit 16 may unlock or maintain the lock state of the mobile communication device 1 according to a specific setting preset by the user.

In the step S14 of FIG. 3, when the processing unit 16 determines that the user input password UIP is different from the unlock password shown in the virtual look-up table, the processing unit 16 may output a first notification message to notice that the user input password UIP is wrong (step S26 in FIG. 3). Take the table 3 for example, when the user inputs "123", "1235" or "12353", the processing unit 16 will determine that the user input password UIP is different from the unlock password. At this time, the processing unit 16 will output the first notification message to notice that the user input password UIP is wrong and maintain the lock state of the mobile communication device 1. Therefore, the user can know that the user input password UIP is wrong according to the first notification message.

In the steps S16, S18 of FIG. 3, when the processing unit 16 determines that there is no user input code UIC and then determines that the user does not want to rapidly make a phone call in the lock state, the processing unit 16 will unlock the lock state of the mobile communication device 1 and display a system screen (step S28 in FIG. 3). Take the table 3 for example, when the user inputs "1234", the processing unit 16 will unlock the lock state of the mobile communication device 1 and display a system screen accordingly.

In the step S22 of FIG. 3, when the processing unit 16 determines that the user input code UIC is different from each of the speed dial codes shown in the virtual look-up table, the processing unit 16 may output a second notification message to notice that the user input code UIC is wrong (step S30 in FIG. 3). Take the table 3 for example, when the user inputs "12349" or "123410", the processing unit 16 will determine that the user input code UIC is different from each of the speed dial codes shown in the virtual look-up table. At this time, the processing unit 16 will output the second notification message to notice that the user input code UIC is wrong and maintain the lock state of the mobile communication device 1. Therefore, the user can know that the user input code UIC is wrong according to the second notification message.

In the step S24 of FIG. 3, after finishing the phone call, the processing unit 16 may unlock or maintain the lock state of the mobile communication device 1 according to a specific setting preset by the user (step S32 in FIG. 3).

It should be noted that the user may also set more than ten speed dial codes according to practical applications, so the speed dial code may be two or more than two bits.

It should be noted that the control logic of the method capable of rapidly making a phone call in a lock state shown in FIG. 3 can be implemented by software. The software can be executed in any electronic device with communication and screen lock functions, such as a mobile phone, a personal digital assistant, a tablet computer, etc. Needless to say, each part or function of the control logic may be implemented by software, hardware or the combination thereof.

As mentioned in the above, a user can set the speed dial codes and the phone numbers corresponding to the speed dial codes in the mobile communication device of the invention in advance. When the mobile communication device of the invention is in the lock state, the user can operate the input unit to sequentially input the user input password and the user input code. When the processing unit determines that the user input password is identical to the unlock password and user input code is identical to one of the speed dial codes, the processing unit dials the phone number corresponding to the speed dial code through the communication unit accordingly. Therefore, the mobile communication device of the invention is capable of rapidly making a phone call in the lock state without increasing any hardware cost. After finishing the phone call, the processing unit may unlock or maintain the lock state of the mobile communication device according to a specific setting preset by the user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A mobile communication device, which is capable of rapidly making a phone call in a lock state, comprising:
   a storage unit for storing an unlock password, M speed dial codes and N phone numbers, each of the M speed dial codes being corresponding to one of the N phone numbers, N being a positive integer, M being a positive integer smaller than or equal to N;
   an input unit;
   a communication unit; and
   a processing unit electrically connected to the storage unit, the input unit and the communication unit;
   wherein when the input unit is operated to sequentially input a user input password and a user input code in the lock state, the processing unit determines whether the user input password is identical to the unlock password and determines whether the user input code is identical to one of the M speed dial codes, when the user input password is identical to the unlock password and the user input code is identical to an i-th speed dial code of the M speed dial codes, the processing unit dials the phone number corresponding to the i-th speed dial code through the communication unit, i is a positive integer smaller than or equal to M.

2. The mobile communication device of claim 1, wherein when the user input password is different from the unlock password, the processing unit outputs a first notification message to notice that the user input password is wrong.

3. The mobile communication device of claim 2, wherein when the user input password is identical to the unlock password but the user input code is different from each of M speed dial codes, the processing unit outputs a second notification message to notice that the user input code is wrong.

4. The mobile communication device of claim 1, wherein after finishing dialing the phone number corresponding to the i-th speed dial code, the processing unit unlocks the lock state of the mobile communication device.

5. The mobile communication device of claim 1, wherein after finishing dialing the phone number corresponding to the i-th speed dial code, the processing unit maintains the lock state of the mobile communication device.

6. The mobile communication device of claim 1, wherein the storage unit stores a first look-up table and a second look-up table, the first look-up table records the unlock password and an identification code, the second look-up table records the M speed dial codes, M of the N phone numbers corresponding to the M speed dial codes, and the identification code, the processing unit combines the first look-up table and the second look-up table according to the identification code to form a virtual look-up table, the processing unit determines whether the user input password is identical to the unlock password and determines whether the user input code is identical to one of the M speed dial codes according to the virtual look-up table.

7. A method, which is capable of rapidly making a phone call in a lock state, adapted to a mobile communication device, the mobile communication device comprising a storage unit, an input unit, a communication unit and a processing unit, the processing unit being electrically connected to the storage unit, the input unit and the communication unit, the storage unit storing an unlock password, M speed dial codes and N phone numbers, each of the M speed dial codes being corresponding to one of the N phone numbers, N being a positive integer, M being a positive integer smaller than or equal to N, the method comprising:
   the input unit sequentially inputting a user input password and a user input code in the lock state;
   the processing unit determining whether the user input password is identical to the unlock password and determining whether the user input code is identical to one of the M speed dial codes; and
   when the user input password is identical to the unlock password and the user input code is identical to an i-th speed dial code of the M speed dial codes, the processing unit dialing the phone number corresponding to the i-th speed dial code through the communication unit, wherein i is a positive integer smaller than or equal to M.

8. The method of claim 7, further comprising:
   when the user input password is different from the unlock password, the processing unit outputting a first notification message to notice that the user input password is wrong.

9. The method of claim 8, further comprising:
   when the user input password is identical to the unlock password but the user input code is different from each of M speed dial codes, the processing unit outputting a second notification message to notice that the user input code is wrong.

10. The method of claim 7, further comprising:
    after finishing dialing the phone number corresponding to the i-th speed dial code, the processing unit unlocking the lock state of the mobile communication device.

11. The method of claim 7, further comprising:
    after finishing dialing the phone number corresponding to the i-th speed dial code, the processing unit maintaining the lock state of the mobile communication device.

12. The method of claim 7, wherein the storage unit stores a first look-up table and a second look-up table, the first look-up table records the unlock password and an identification code, the second look-up table records the M speed dial codes, M of the N phone numbers corresponding to the M speed dial codes, and the identification code, the method further comprises:
    the processing unit combining the first look-up table and the second look-up table according to the identification code to form a virtual look-up table; and
    the processing unit determining whether the user input password is identical to the unlock password and determining whether the user input code is identical to one of the M speed dial codes according to the virtual look-up table.

13. A mobile communication device, which is capable of rapidly making a phone call in a lock state, comprising:
    a storage unit for storing an unlock password, a speed dial code and a plurality of phone numbers, the speed dial code being corresponding to one of the phone numbers;
    an input unit;
    a communication unit; and
    a processing unit electrically connected to the storage unit, the input unit and the communication unit;
    wherein when the input unit is operated to sequentially input a user input password and a user input code in the lock state, the processing unit determines whether the user input password is identical to the unlock password and determines whether the user input code is identical to the speed dial code, when the user input password is identical to the unlock password and the user input code is identical to the speed dial code, the processing unit dials the phone number corresponding to the speed dial code through the communication unit.

14. The mobile communication device of claim 13, wherein when the user input password is different from the unlock password, the processing unit outputs a first notification message to notice that the user input password is wrong.

15. The mobile communication device of claim 14, wherein when the user input password is identical to the unlock password but the user input code is different from the speed dial code, the processing unit outputs a second notification message to notice that the user input code is wrong.

16. The mobile communication device of claim 13, wherein after finishing dialing the phone number corresponding to the speed dial code, the processing unit unlocks the lock state of the mobile communication device.

17. The mobile communication device of claim 13, wherein after finishing dialing the phone number corresponding to the speed dial code, the processing unit maintains the lock state of the mobile communication device.

18. The mobile communication device of claim 13, wherein the storage unit stores a first look-up table and a second look-up table, the first look-up table records the unlock password and an identification code, the second look-up table records the speed dial code, the phone number corresponding to the speed dial code, and the identification code, the processing unit combines the first look-up table and the second look-up table according to the identification code to form a virtual look-up table, the processing unit determines whether the user input password is identical to the unlock password and determines whether the user input code is identical to the speed dial code according to the virtual look-up table.

* * * * *